United States Patent
Li et al.

(10) Patent No.: US 8,452,921 B1
(45) Date of Patent: May 28, 2013

(54) PROVISIONING A PASS-THROUGH DISK IN A VIRTUALIZED COMPUTING ENVIRONMENT

(75) Inventors: Song Li, Sunnyvale, CA (US); Thien Nguyen, Milpitas, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 478 days.

(21) Appl. No.: 12/725,793

(22) Filed: Mar. 17, 2010

(51) Int. Cl.
*G06F 12/00* (2006.01)

(52) U.S. Cl.
USPC ......... 711/112; 711/6; 711/113; 711/E12.016

(58) Field of Classification Search
USPC .................. 711/112, 6, 113, E12.016
See application file for complete search history.

(56) References Cited

U.S. PATENT DOCUMENTS

2010/0306173 A1* 12/2010 Frank ........................... 707/640

* cited by examiner

*Primary Examiner* — Yong Choe
(74) *Attorney, Agent, or Firm* — Blakely, Sokoloff, Taylor & Zafman LLP

(57) ABSTRACT

A physical host machine determines that a storage device from a network storage system is available to the host machine as a pass-through disk. Virtualization software running on the host machine assigns the pass-through disk to a temporary resource group on the host machine. The pass-through disk is logically attached to the virtual machine running on the host machine and made available to an operating system and application running on the virtual machine.

20 Claims, 8 Drawing Sheets

PROVISIONING A PASS-THROUGH DISK IN A VIRTUALIZED COMPUTING ENVIRONMENT

TECHNICAL FIELD

This invention relates to the field of virtualization systems and, in particular, to an automatic end-to-end pass-through disk provisioning solution.

BACKGROUND

Virtualization is an abstraction that decouples the physical hardware from the operating system in a data processing system to deliver greater resource utilization and flexibility. Virtualization allows multiple virtual machines with heterogeneous operating systems (e.g., Windows™, Linux™, UNIX™, etc.) and applications to run in isolation, side-by-side on the same physical host machine. A virtual machine is the representation of a physical machine by software. A virtual machine has its own set of virtual hardware (e.g., random access memory (RAM), central processing unit (CPU), network interface card (NIC), hard disks, etc.) upon which an operating system and applications are loaded. The operating system sees a consistent, normalized set of hardware regardless of the actual physical hardware components.

A conventional virtualized processing system may include a physical host machine which runs virtualization software such as a hypervisor. The hypervisor software runs on the physical host machine (e.g., a computer) and abstracts physical hardware (e.g., processors, memory, storage and networking resources, etc.) to be provisioned to one or more virtual machines.

A guest operating system (e.g., Windows™, Linux™, UNIX™, etc.) may be installed on each of the virtual machines. The virtualization software presents the physical hardware of the host machine as virtual hardware to the guest operating system and applications running in the guest operating system. A user may access the virtual machine to perform computing tasks as if it were a physical machine. Generally, the virtualization process is completely transparent to the user.

A pass-through disk is a way for virtual machines to directly access a physical disk in a virtualized computing environment. The virtualization software on the host machine provides an Application Programming Interface (API) or other tools to assign pass-through disks to the virtual machines. The user cannot, through the virtual machine, provision a pass-through disk on the host machine if necessary, and attach the pass-through disk to the virtual machine. Furthermore, the user cannot remove a provisioned pass-through disk.

SUMMARY OF THE INVENTION

A physical host machine determines that a storage device from a network storage system is available to the host machine as a pass-through disk. Virtualization software running on the host machine assigns the pass-through disk to a temporary resource group on the host machine. The pass-through disk is logically attached to the virtual machine running on the host machine and made available to an operating system and application running on the virtual machine.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Embodiments are described for an end-to-end solution for provisioning a pass-through disk from a network storage system to a virtual machine. Software components that run in a hypervisor on a physical host machine and in virtualization software running on both the physical host machine and the target virtual machine collaborate to provide the functionality described below. In one embodiment for a high availability virtual machine running in a host cluster configuration, the pass-through disk is provisioned as a shared cluster disk. At the request of virtualization software running on a high availability virtual machine, virtualization software running on the host machine provisions a LUN from the network storage system and maps it to the host as a cluster disk. The virtualization software on the host machine creates a temporary resource group, adds a disk resource representing the LUN to the temporary resource group, and logically attaches the LUN to the requesting virtual machine. The hypervisors on the host machine and other host machines in the cluster are updated to show that the LUN is serving as a pass-through disk for the virtual machine. The disk resource is moved from the temporary resource group to a virtual machine resource group and the temporary resource group is deleted. The pass-through disk is made available to an operating system and applications running on the virtual machine. In response to a request from the virtual machine to remove the pass-through disk, reverse operations are performed.

Figure 1:
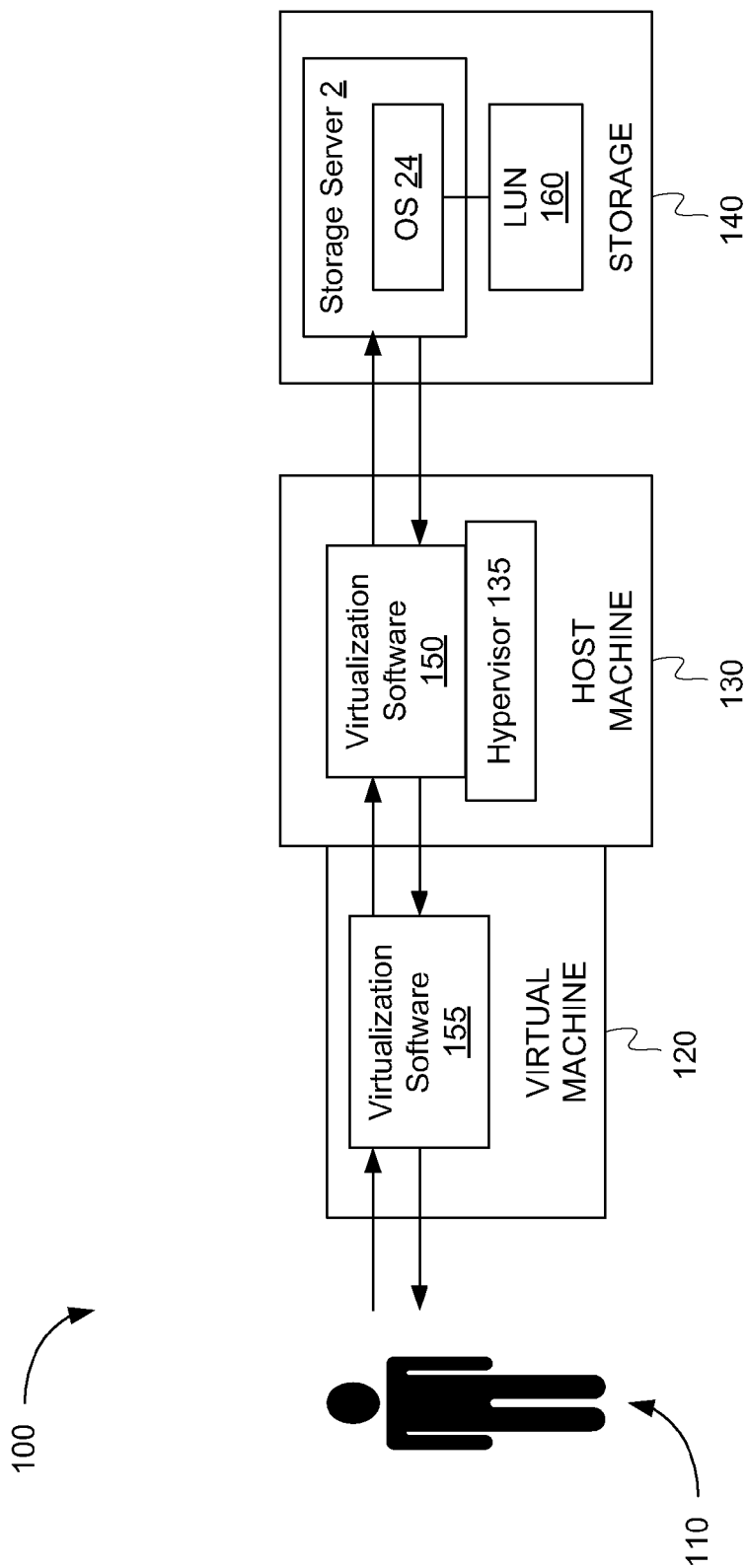
FIG. 1 is a block diagram illustrating a network environment according to an embodiment.

FIG. 1 is a block diagram illustrating a network environment according to an embodiment of the present invention. The network environment 100 includes physical host machine 130 and network storage system 140. In one embodiment, network storage system 140 is a storage area network (SAN). Network storage system 140 may include a processing system 2 configured to store and retrieve data. Network storage system 140 operates to store and manage shared storage objects (e.g., files) in a set of mass storage devices, such as magnetic or optical disks or tapes, or flash drives. The mass storage devices may be organized into one or more volumes of a Redundant Array of Inexpensive Disks (RAID). In a SAN context, the storage server 2 provides block-level access to stored data, rather than file-level access.

Host machine 130 may be a physical computer having a processor to execute instructions stored in memory. Host machine 130 may run a hypervisor 135, such as for example, Hyper-V in the Microsoft Windows Server® 2008 R2 operating system. Hypervisor 135 enables host machine 130 to host one or more virtual machines, each running its own operating system. In one embodiment, host machine 130 is also running virtualization software 150 which may enable the provisioning of storage from the network storage system 140 through the virtual machines. In one embodiment, virtualization software 150 includes NetApp® SnapDrive™ for Windows, developed by NetApp, Inc. of Sunnyvale, Calif. One of the virtual machines may be virtual machine 120. In one embodiment, virtual machine 120 runs the same operating system as host machine 130. In other embodiments, virtual machine 120 may run a different operating system, such as for example, Microsoft Windows Server® 2003, 2008, or another operating system. Virtual machine 120 may also be running virtualization software 155.

In network environment 100, a user 110 may desire to provision a pass-through disk. A pass-through disk is a mass storage device logically attached to the host machine 130, but assigned directly to virtual machine 120 and formatted with an abstraction layer, such as a file system, recognizable by the operating system of virtual machine 120. In one embodiment, the user 110, through virtualization software 155 running on virtual machine 120, makes a request for a pass-through disk. The virtualization software 155 on the virtual machine 120 forwards the request to the virtualization software 150 running on the host machine 130. In one embodiment, virtualization software 150 on the host machine 130 determines if the host machine 130 is hypervisor enabled and whether the operating system on the host machine 130 supports certain features, such as for example, hot add/delete features. This information may be determined by querying the operating system of host machine 130.

Figure 6:
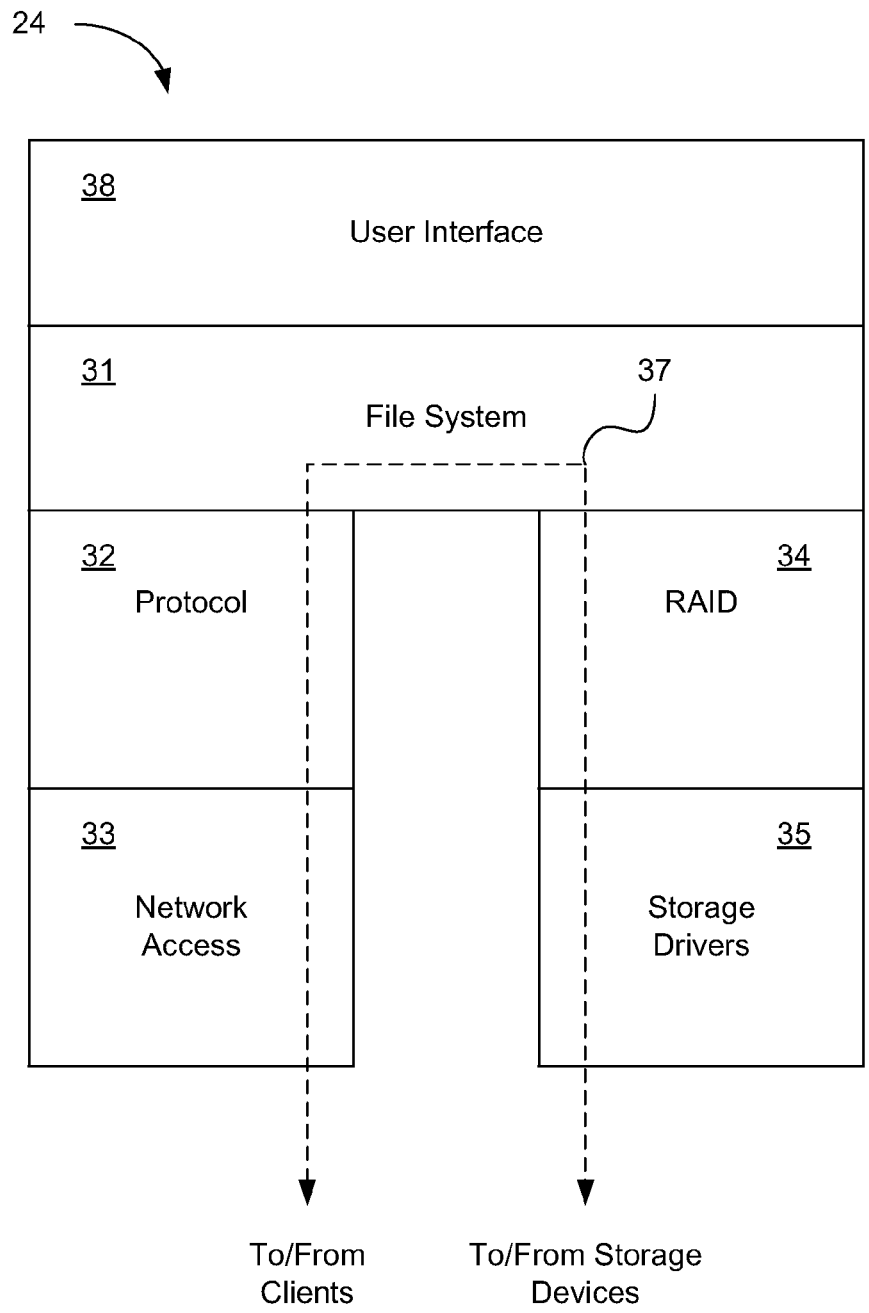
FIG. 6 is a block diagram illustrating the architecture of the operating system of a storage server according to an embodiment.

If host machine 130 has the proper features, the virtualization software 150 on the host machine 130 sends the request for the pass-through disk to the network storage system 140 to provision a Logical Unit Number (LUN) 160. An operating system, such as operating system 24 as shown in FIG. 6, running on the storage server 2 of network storage system 140 creates the LUN 160 and maps it to the host machine 130. Mapping a LUN to host machine 130 may include writing an identifier of LUN 160 into a data structure representing the storage resources associated with host machine 130. In one embodiment, virtualization software 150 on the host machine 130 determines if there is a virtual small computer system interface (SCSI) controller for virtual machine 120 resident on the host machine 130 and whether the controller has a free slot (e.g., the capability to manage an additional storage device). If so, virtualization software 150 calls the hypervisor 135 APIs to logically attach the LUN 160 to the virtual machine 120. These actions may be performed using an operating system interface, such as for example, Windows Management Interface (WMI). The virtualization software 155 on the virtual machine 120 uses an API to discover the logically attached LUN 160, mount a volume, assign a drive path name to the LUN 160 and present it to the user 110.

Figure 2:
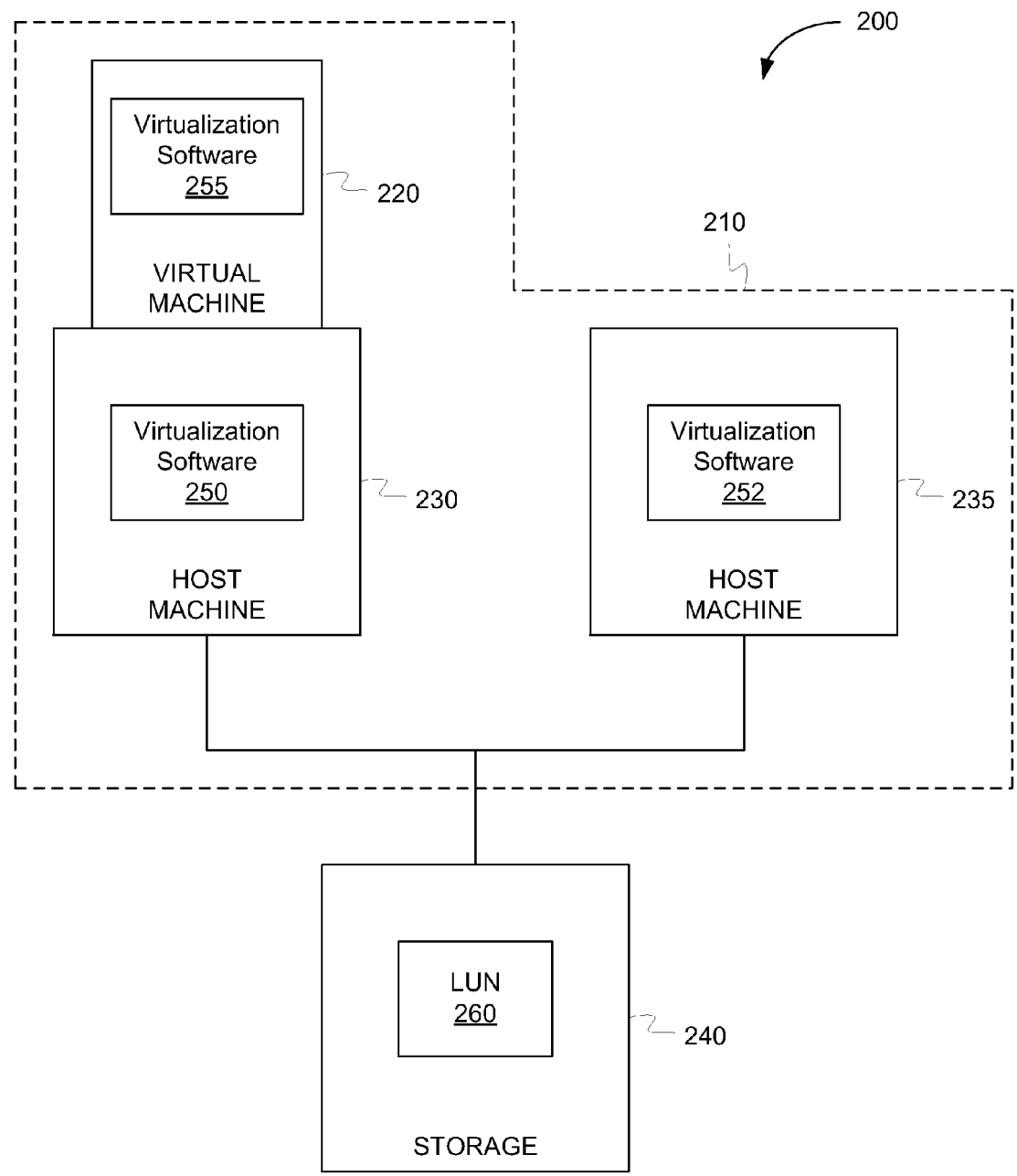
FIG. 2 is a block diagram illustrating a network environment according to an embodiment.

FIG. 2 is a block diagram illustrating a network environment according to an embodiment of the present invention. The network environment 200 includes a host cluster 210, including physical host machines 230 and 235, and network storage system 240. Network environment 200 also includes high availability (HA) virtual machine 220 running on one host machine (i.e., host machine 230) of the cluster 210. In one embodiment, each of host machines 230 and 235 and virtual machine 220 are running virtualization software (250, 252 and 255, respectively). In this embodiment, the cluster 210 includes two physical host machines (230 and 235). In other embodiments, however, the cluster 210 may include any number of physical host machines.

Figure 3:
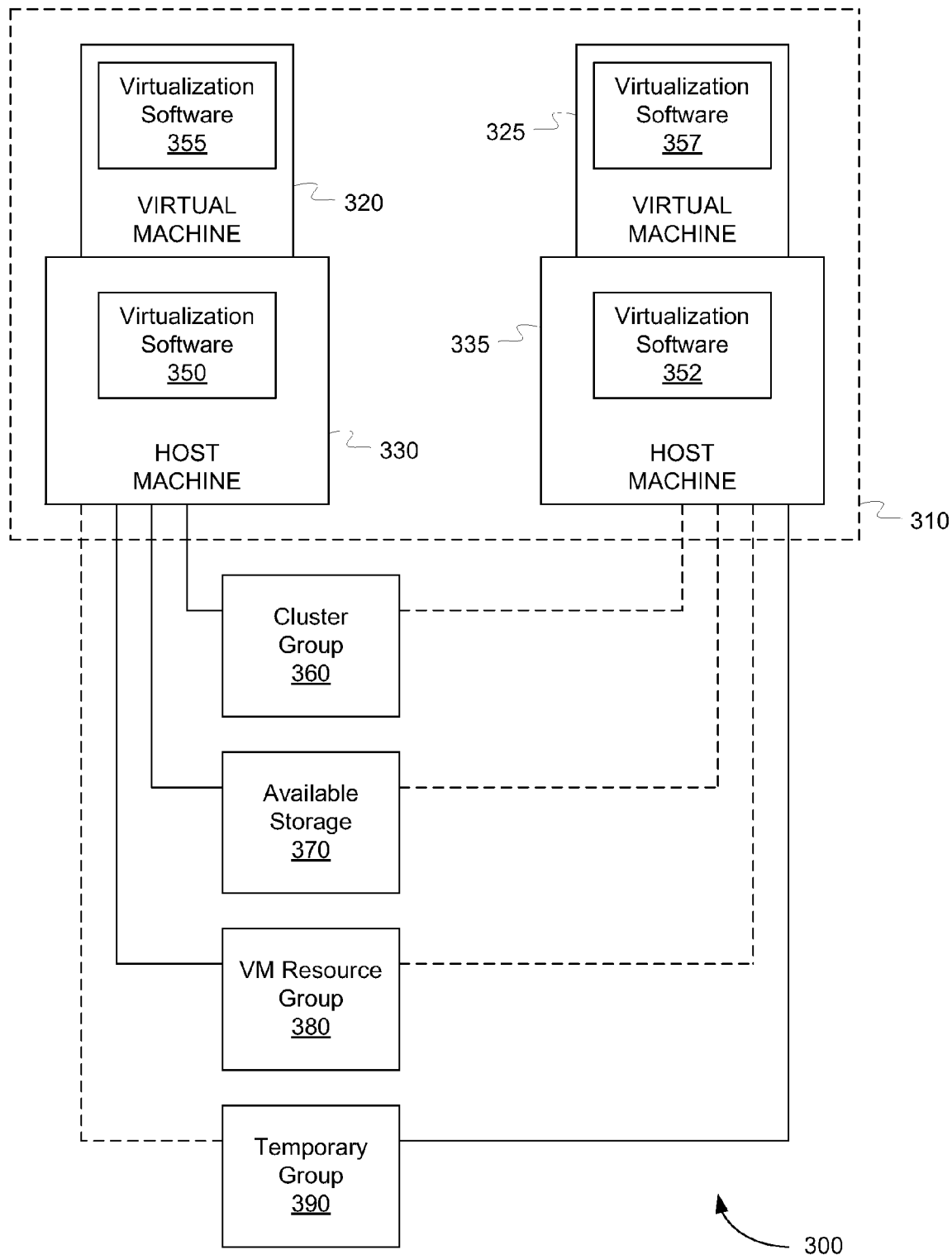
FIG. 3 is a block diagram illustrating a network environment according to an embodiment.

As discussed above, a user of virtual machine 220 may wish to provision a pass-through disk. Virtualization software 250 on host machine 230 may provision a LUN in response to the request as discussed with respect to FIG. 1. However, because virtual machine 220 is a high-availability virtual machine running in a cluster of host machines, the LUN is provisioned as a shared LUN 260. When the shared LUN 260 is provisioned through virtual machine 220, virtualization software 250 places virtual machine 220 and shared LUN 260 in a virtual machine resource group, as shown in FIG. 3.

One feature of the cluster is that if one physical host machine fails, the virtual machine may be automatically moved to another host machine in the cluster. This process is typically transparent to the user. For example, virtual machine 220 may be currently running on host machine 230. If host machine 230 fails, for example due to a hardware or software error, a clustering system in the operating systems of the host machines in cluster 210 can detect the failure and automatically move virtual machine 220 to host machine 235. When moved, the virtual machine resource group is transferred from the failed host machine 230 to another host machine 235 in the cluster 210 along with all resources in the resource group.

A software module, such as a cluster manager operating within the operating system of host machine 230 may list the resources for each resource group. In one embodiment, the name of the shared pass-through disk may be stored with the name of the associated virtual machine and the name of the mount point on the virtual machine side. For example the name of shared pass-through disk 260 may be "Disk VM[vm1]MP[C:\mt1]".

In one embodiment, when a shared disk is added to a virtual machine, the resource is added to a fixed resource group called "Available Storage" resource group.

The Available Storage resource group may be a data structure listing all available storage resources that is stored on the host machine, as shown in FIG. 3. After the LUN is logically attached to a virtual machine, an API call enumerates the LUN, which is identified in the Available Storage group. This Available Storage group is owned only by one host machine in the cluster at any moment. In one embodiment, the virtual machine must be running on the same physical host machine as the Available Storage group to provision a pass-through disk. To provision a pass-through disk on a virtual machine running on a host machine that does not currently own the Available Storage group (i.e., the Available Storage group is not accessible to the host machine), a temporary resource group is created as illustrated in FIG. 3. In an alternative embodiment, the virtual machine uses the temporary resource group regardless of whether or not the host machine owns the Available Storage group.

FIG. 3 is a block diagram illustrating a network environment according to an embodiment of the present invention. The network environment 300 includes a cluster 310 of physical host machines 330 and 335, with each physical host machine running a virtual machine, 320 and 325 respectively.

In other embodiments, there may be any number of host machines in the cluster 310 and each host machine may run more than one virtual machine. Each of the host machines and virtual machines in the network environment 300 may be running virtualization software, 350, 352, 355 and 357, respectively.

Each host machine in the cluster may be viewed as either active or passive with respect to a particular virtual machine. For example, virtual machine 320 is currently running on physical host machine 330, so host machine 330 is active with respect to virtual machine 320 and its associated resource groups. In one embodiment, active resources groups on host machine 330 include cluster group 360, Available Storage 370 and virtual machine resource group 380. In one embodiment, the resource groups are stored in a memory of host machine 330, however depending on the cluster implementation, the resource groups may be stored in some other location. The active attachment is illustrated in FIG. 3 by the solid lines between host machine 330 and the resource groups. The remaining host machines in the cluster group are considered passive with respect to virtual machine 320 because, while not currently hosting virtual machine 320 and its resources, virtual machine 320 could be transferred to another host machine in the cluster as discussed above. The passive attachment between resource groups and host machine 335 is illustrated by the dotted lines in FIG. 3.

In one embodiment, virtual machine 325 is running on host machine 335 concurrently with virtual machine 320 running on host machine 330. As shown, there is no Available Storage group 370 actively associated with physical host machine 335. Therefore, if a user makes a request for a pass-through disk through virtual machine 325, virtualization software 352 on host machine 335 either locates an existing LUN, or requests that the operating system of a network storage system (not shown) provision a LUN, as discussed below with respect to FIG. 4A. Virtualization software 352 maps the LUN to the physical host machine 335, and generates a temporary resource group 390. In certain embodiments, temporary resource group 390 may be a data structure stored in memory on host machine 335 or a series of memory addresses reserved to store the contents of the temporary resource group. In one embodiment, temporary resource group 390 is given the name of the associated virtual machine and the name of the mount point on the virtual machine side. For example the name temporary resource group 390 may be "Disk VM[vm1]MP[C:\mt1]Group". A disk resource representing the LUN is added to temporary resource group 390 by writing the name of the disk resource to the data structure that makes up temporary resource group 390. Virtualization software 352 logically attaches the LUN to virtual machine 325. Once the pass-through disk is logically attached to virtual machine 325, the provisioned disk resource is moved from the temporary resource group to the virtual machine resource group that virtual machine 325 belongs to, and the temporary resource group is removed.

Figure 4A:
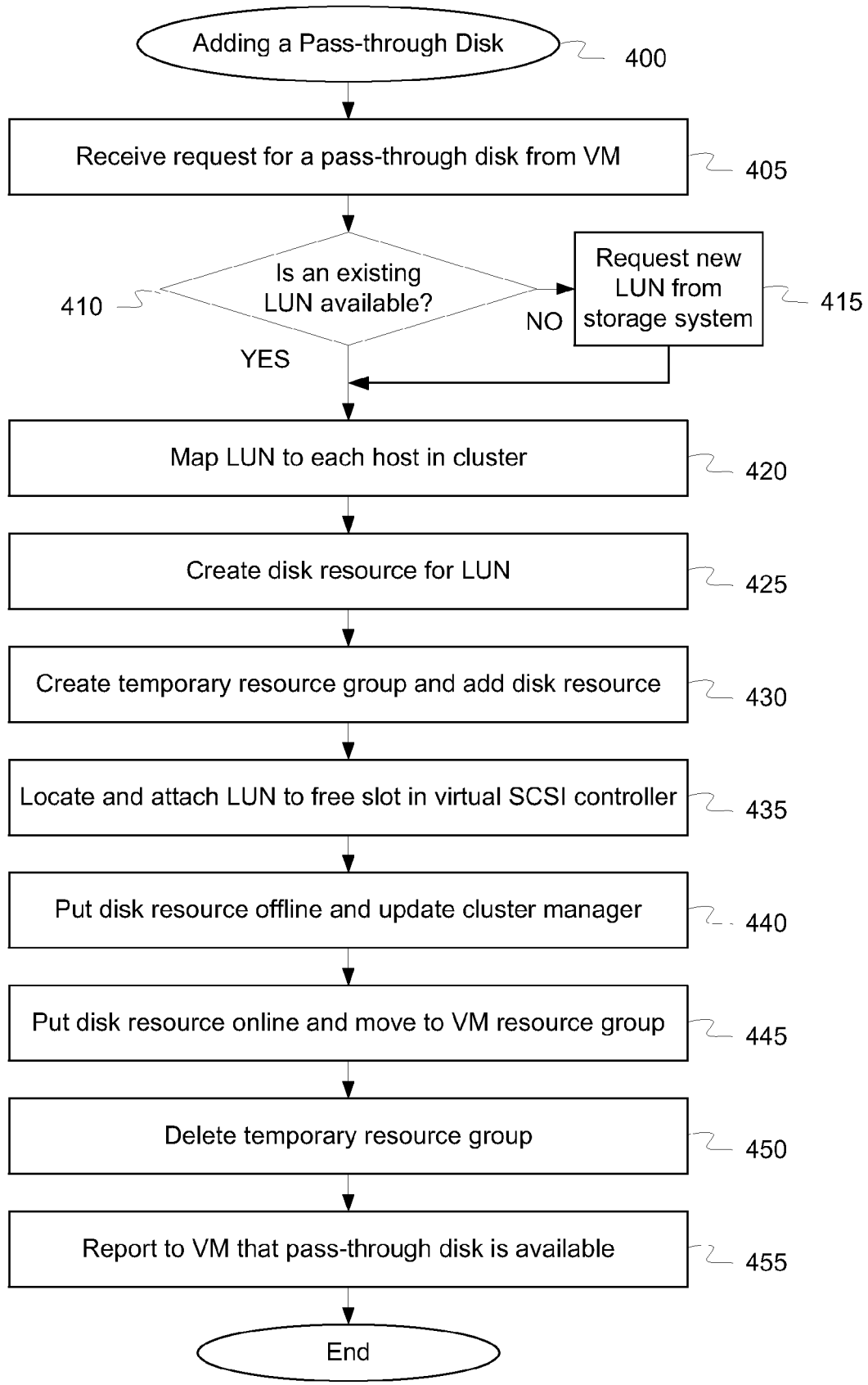
FIG. 4A is a flow chart illustrating a method of adding a pass-through disk according to an embodiment.

FIG. 4A is a flow chart illustrating a method 400 of adding a pass-through disk according to an embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. In certain embodiments, method 400 may be performed by virtualization software 150, 250, 252, 350 or 352, as shown in FIGS. 1-3.

In one embodiment, at block 405, method receives a request for a pass-through disk from a connected virtual machine, such as virtual machine 325 of FIG. 3. The request may be made by a user through virtualization software 357 running on the connected virtual machine 325. At decision block 410, method 400 determines whether an existing LUN is available to serve as the pass-through disk. Method 400 may determine whether an existing LUN is available by checking the available storage resource group 370. If at block 410, method 400 determines that an existing LUN is not available, at block 415, method 400 requests that a new LUN be provisioned by attached connected network storage system, such as storage system 140 of FIG. 1. Network storage system 140 provisions a LUN and maps it to host machine 335.

If at block 410, method 400 determines that an existing LUN is available, method 400 proceeds to block 420. At block 420, method 400 sends a command to virtualization software running on all other cluster host machines to map the temporary resource group to their physical host machines. In the event of a failure of host machine 335, the temporary resource group may be transferred to another host machine, allowing virtual machine 325 to operate on the new physical host machine. The transfer may be performed automatically by cluster manager software of the host machine operating system and may be transparent to a user of the virtual machine. In one embodiment, when the cluster manager transfers the resource groups, an identifier of the resource group is removed from a data structure representing the available resource groups of the first host machine and added to a data structure representing the resource groups of the new host machine. At block 425, method 400 creates a disk resource for the LUN. The disk resource is a representation of the LUN that is used by virtualization software to assign the LUN in network storage to the requesting virtual machine. At block 430, method 400 creates a temporary resource group, such as temporary resource group 390 of FIG. 3, and adds the disk resource from block 425 to the temporary resource group. The temporary resource group identifies the virtual machine requesting the pass-through disk and the LUN that will serve as the pass-through disk. In a SCSI environment, at block 435, method 400 locates a free slot in a virtual SCSI controller and logically attaches the LUN to the free slot. In one embodiment, logically attaching the LUN includes associating a disk name or a file path name with an identifier representing a free slot of the virtual SCSI controller. When a LUN on a network storage system is mapped to a host machine, the operating system of the host machine may view the LUN as a local hard disk. Thus, host side operations on the LUN may be referred to in terms of a disk. The virtual SCSI controller may be part of the hypervisor software running on host machine 335, but may be associated with virtual machine 325. In other embodiments, virtual disk controllers other than SCSI may be used at block 435.

Once the LUN is identified in the temporary resource group, at block 440, method 400 puts the disk resource offline, making it unavailable to the virtual machine 325, and updates a cluster manager running on the host machine with the virtual machine configuration change (i.e., the addition of a new physical disk). In one embodiment, putting a disk resource offline includes marking a bit in the disk resource to signify that the disk resource is offline. In another embodiment, putting the disk resource offline includes adding the disk resource to a data structure representing all storage resources that are offline. At block 445, method 400 puts the disk resource online and moves the disk resource from the temporary resource group to a virtual machine resource group, such as moving the resource from temporary resource group 390 to virtual machine resource group 380, as shown in FIG. 3. In one embodiment, moving the disk resource includes removing an identifier of the storage resource from a data structure representing the temporary resource group and adding the identifier to a data structure representing the virtual machine resource group. At block 450, method 400 deletes the temporary resource group. At block 455, method 400 reports to virtualization software running on the virtual machine that the LUN is available as a pass-through disk.

Figure 4B:
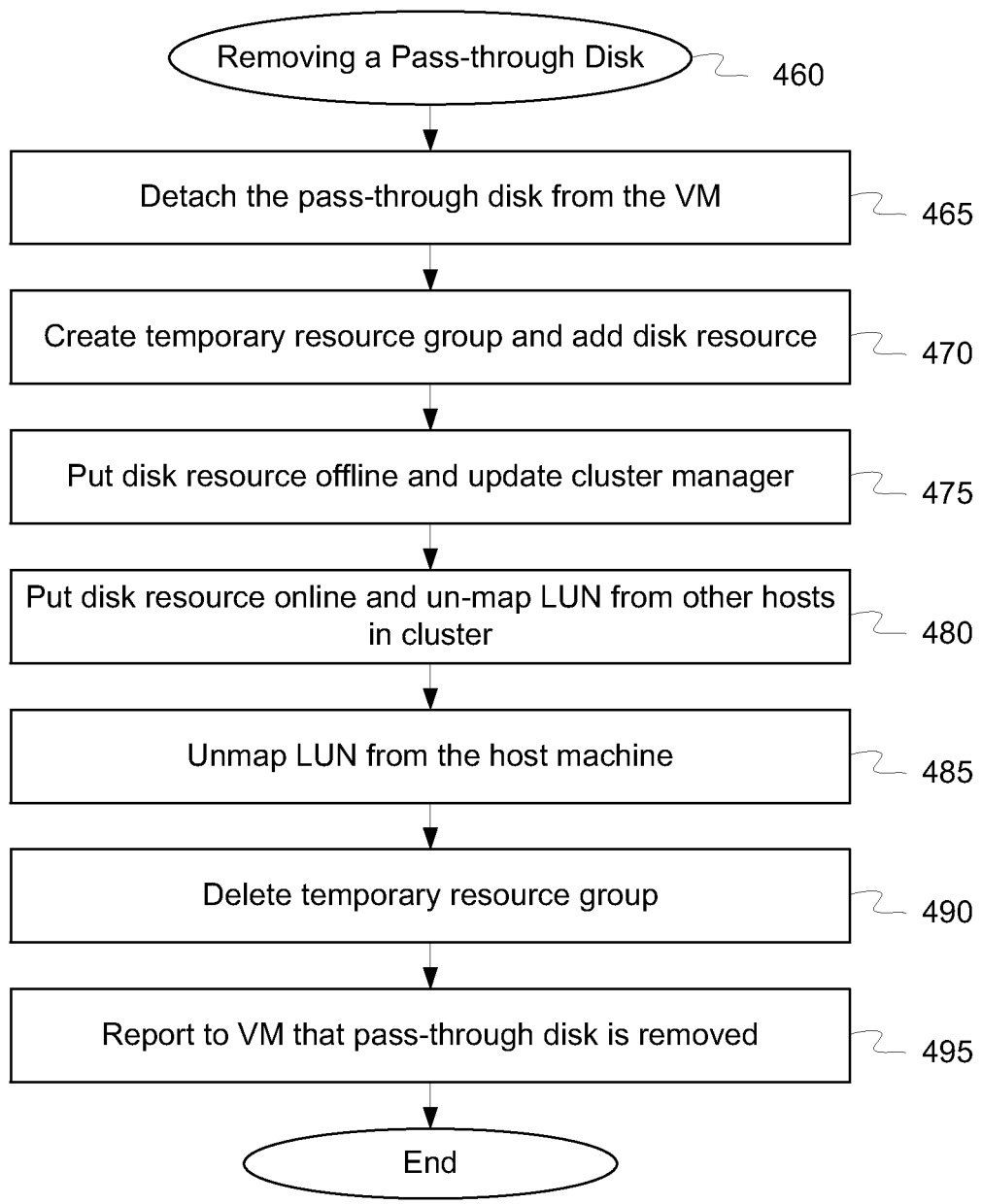
FIG. 4B is a flow chart illustrating a method of removing a pass-through disk according to an embodiment.

FIG. 4B is a flow chart illustrating a method 460 of removing a pass-through disk according to an embodiment. In certain embodiments, method 400 may be performed by virtualization software 150, 250, 252, 350 or 352, as shown in FIGS. 1-3. In response to a request by a user made through a virtual machine, such as virtual machine 325 of FIG. 3, at block 465, method 460 logically detaches the pass-through disk from the virtual machine 325. In one embodiment, logically detaching the pass-through disk includes logically detaching a pass-through disk resource logically attached to a virtual storage controller. In one embodiment, the virtual storage controller belongs to virtual machine 325, but is running on a physical host machine, such as host machine 335.

At block 470, method 460 creates a temporary resource group, such as temporary resource group 390 of FIG. 3 and adds the disk resource for the pass-through disk to the temporary resource group. At block 475, method 460 puts the disk resource offline, making it unavailable to the virtual machine 325, and updates a cluster manager running on the host machine with the virtual machine configuration change (i.e., the removal of the pass-through disk). At block 480, method 460 puts the disk resource online and sends a command to virtualization software running on all other cluster host machines to un-map the temporary resource group from their physical host machines. Un-mapping a temporary resource group may include removing an identifier of the temporary resource group from a data structure representing the storage resources associated with host machine.

At block 485, method 460 un-maps the LUN from physical host machine 335. At block 490, method 460 deletes the temporary resource group from host machine 335. At block 495, method 460 reports to virtualization software running on the virtual machine that the pass-through disk has been removed.

Figure 5:
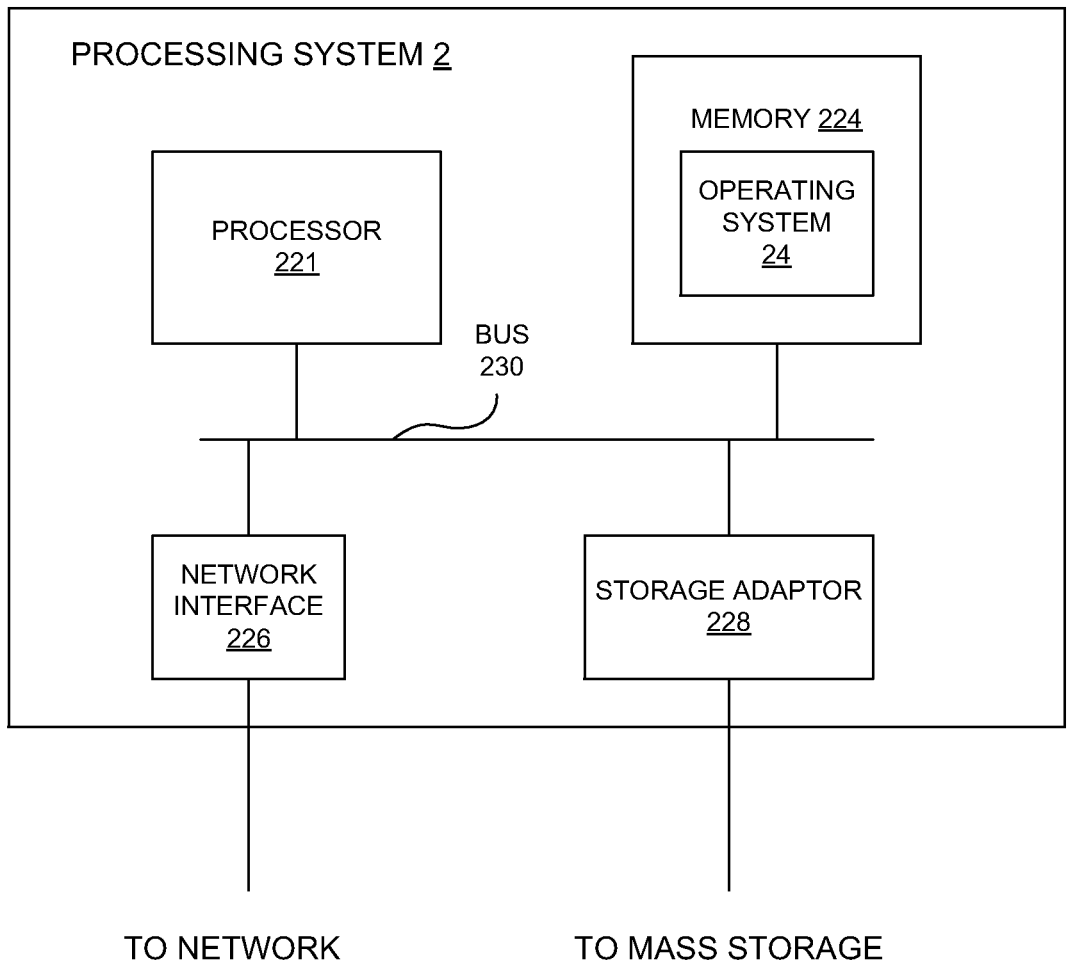
FIG. 5 is a block diagram illustrating the hardware architecture of a processing system according to an embodiment.

FIG. 5 illustrates a schematic block diagram of one embodiment of a processing system 2 which may implement the above-described methods, according to certain embodiments of the invention. Processing system 2 may be representative of a physical host machine, such as host machine 130, or a network storage system, such as storage system 140 in FIG. 1. Referring to FIG. 5, in this embodiment, the processing system 2 includes a processor 221, a memory 224, a network interface 226, and a storage adaptor 228, which are coupled to each other via a bus system 230. The bus system 230 may include one or more busses and/or interconnects. The processing system 2 communicates with a network via the network interface 226, which may be an Ethernet adaptor, fiber channel adaptor, etc. The network interface 226 may be coupled to a public network, a private network, or a combination of both in order to communicate with a client machine usable by an administrator of the remote data storage system.

In one embodiment, the processor 221 reads instructions from the memory 224 and executes the instructions. The memory 224 may include any of various types of memory devices, such as, for example, random access memory (RAM), read-only memory (ROM), flash memory, one or more mass storage devices (e.g., disks), etc. The memory 224 stores instructions of an operating system 24. The processor 221 retrieves the instructions from the memory 224 to run the operating system 24. The processing system 2 interfaces with one or more storage systems via the storage adaptor 228, which may include a small computer system interface (SCSI) adaptor, fiber channel adaptor, etc.

The processing system 2 may have a distributed architecture; for example, it may include a separate N-("network") blade and D-("disk") blade (not shown). In such an embodiment, the N-blade is used to communicate with clients, while the D-blade includes the abstraction layer functionality and is used to communicate with the storage subsystem. In one embodiment, the N-blade and D-blade communicate with each other using an internal protocol. In one embodiment, where the N-blade or D-blade has its own separate processor and memory, separate from that of the storage server, the storage device slicing method, as further described below, is implemented within the N-blade or D-blade. Alternatively, the processing system 2 may have an integrated architecture, where the network and data components are all contained in a single box. The processing system 2 further may be coupled through a switching fabric to other similar storage systems (not shown) which have their own local storage subsystems. In this way, all of the storage subsystems can form a single storage pool, to which any client of any of the storage systems has access.

FIG. 6 shows an example of the operating system 24 of the processing system 2. In one embodiment, operating system 24 is used on storage server 2 in network storage system 140. As shown, the operating system 24 includes several modules, or "layers." These layers include an abstraction layer, such as file system 31. The file system 31 is software, executed by a processor, that imposes a hierarchy (e.g., a directory/file structure) on the data stored in the storage subsystem and manages read/write operations on the data (i.e., executes read/write operations on the disks in response to client requests). The operating system 24 also includes a protocol layer 32 and an associated network access layer 33, to allow the processing system 2 to communicate over the network (e.g., with clients). The protocol 32 layer implements a number of higher-level network protocols, such as Network File System (NFS), Common Internet File System (CIFS), Hypertext Transfer Protocol (HTTP) and/or Transmission Control Protocol/Internet Protocol (TCP/IP). The network access layer 33 includes one or more drivers which implement one or more lower-level protocols to communicate over the network, such as Ethernet or Fibre Channel.

The operating system 24 also includes a storage access layer 34 and an associated storage driver layer 35, to allow the storage system 2 to communicate with the storage subsystem. The storage access layer 34 implements a higher-level disk storage protocol, such as RAID, while the storage driver layer 35 implements a lower-level storage device access protocol, such as Fibre Channel Protocol (FCP) or SCSI. To facilitate description, it is henceforth assumed herein that the storage access layer 34 implements a RAID protocol, such as RAID-4, RAID-5 or RAID-DP™, and therefore it is alternatively called the "RAID layer" 34.

Also shown in FIG. 6 is the path 37 of data flow, through the operating system 24, associated with a read or write operation. The operating system 24 also includes a user interface 38 to generate a command line interface (CLI) and/or graphical user interface (GUI), to allow administrative control and configuration of the processing system 2, from a local or remote terminal.

Figure 7:
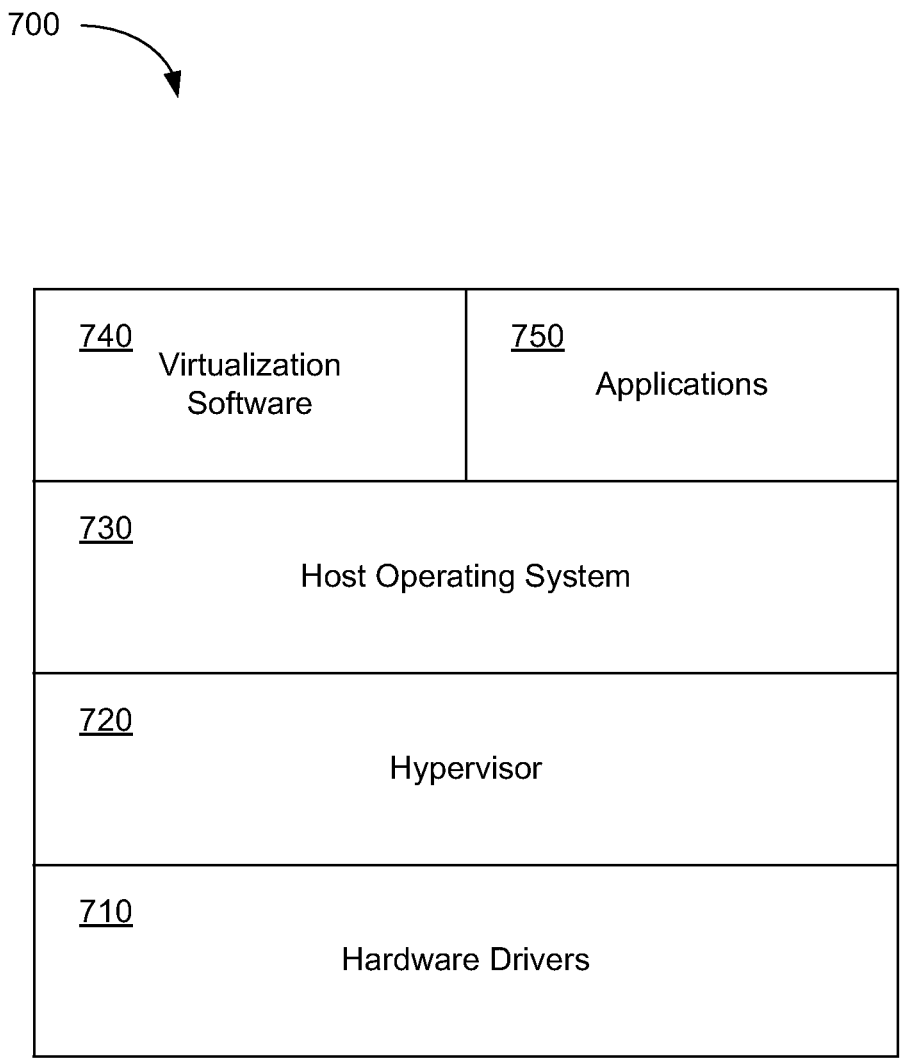
FIG. 7 is a block diagram illustrating the software architecture of a host machine according to an embodiment.

FIG. 7 is a block diagram illustrating the software architecture of a host machine according to an embodiment of the present invention. In one embodiment, software architecture 700 is used on a physical host machine such as host machine 130 in FIGS. 1, 230 and 235 in FIGS. 2, and 330 and 335 in FIG. 3. As shown, the software architecture 700 includes several modules, or "layers." These layers include hardware drivers 710. Hardware drivers 710 allow the software 700 to communicate with the underlying physical hardware of the host machine, such as that shown in FIG. 5. Hypervisor 720 runs on the physical host machine and abstracts physical hardware (e.g., processors, memory, storage and networking resources, etc.) to be provisioned to one or more virtual machines. In one embodiment, hypervisor 720 is the Microsoft Windows Server® 2008 R2 Hyper-V. Host machine operating system 730 controls operation of the physical host machine. In one embodiment, host machine operating system 730 is the Microsoft Windows Server® 2008 R2 operating system. Virtualization software 740 allows the end-to-end provisioning of a pass-through disk by a virtual machine, as described above. In one embodiment, virtualization software 740 is NetApp® SnapDrive™ for Windows. Additional application 750 may also run in the host machine operating system 730.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method, comprising:
  determining, by a host machine, that a storage device from a network storage system is available to the host machine as a pass-through disk;
  receiving, by the host machine a request from the virtual machine for the pass-through disk;
  assigning the pass-through disk to a temporary resource group on the host machine; and
  logically attaching the pass-through disk from the temporary resource group to a virtual machine running on the host machine.

2. The method of claim 1, further comprising:
  if a storage device is not available to the host machine, requesting that the network storage system provision a new storage device.

3. The method of claim 2, wherein the storage device comprises a logical unit number (LUN).

4. The method of claim 1, wherein the temporary resource group comprises a first identifier to identify the virtual machine and a second identifier to identify the pass-through disk.

5. The method of claim 1, wherein logically attaching the pass-through disk to the virtual machine comprises adding a disk resource to the temporary resource group, and logically attaching the disk to a virtual storage controller on the host machine, wherein the virtual storage controller is owned by the virtual machine.

6. The method of claim 5, further comprising:
moving the disk resource from the temporary resource group to a virtual machine resource group on the host machine; and
deleting the temporary resource group.

7. The method of claim 6, further comprising:
notifying the virtual machine that the pass-through disk is available.

8. A system comprising:
an array of mass storage devices;
a network storage system coupled to the array of mass storage devices; and
a host machine running virtualization software, the virtualization software configured to:
determine that a storage device from the array of mass storage devices is available to the host machine as a pass-through disk;
receive a request from the virtual machine for the pass-through disk;
assign a disk resource representing the pass-through disk to a temporary resource group on the host machine; and
logically attach the pass-through disk from the temporary resource group to a virtual machine running on the host machine.

9. The system of claim 8, wherein the virtualization software is further configured to:
request that the network storage system provision a new storage device if a storage device is not available to the host machine.

10. The system of claim 9, wherein the storage device comprises a logical unit number (LUN).

11. The system of claim 8, wherein the temporary resource group comprises a first identifier to identify the virtual machine and a second identifier to identify the pass-through disk.

12. The system of claim 8, wherein when the virtualization software logically attaches the pass-through disk to the virtual machine, the virtualization software is configured to add the disk resource to the temporary resource group and logically attach the disk to a virtual storage controller on the host machine, wherein the virtual storage controller is owned by the virtual machine.

13. The system of claim 12, wherein the virtualization software is further configured to:
notify the virtual machine that the pass-through disk is available.

14. The system of claim 8, wherein the virtualization software is further configured to:
move the disk resource from the temporary resource group to a virtual machine resource group; and
delete the temporary resource group.

15. A processing device comprising:
a processor unit; and
a memory, coupled to the processor unit, storing instructions which, when executed by the processor unit, cause the processing device to:
receive a request from a virtual machine for a pass-through disk;
request that a network storage system provision a new storage device;
assign a disk resource representing the storage device to a temporary resource group on the host machine; and
logically attach the storage device from the temporary resource group to the virtual machine as the pass-through disk.

16. The processing device of claim 15, wherein the storage device comprises a logical unit number (LUN).

17. The processing device of claim 15, wherein the temporary resource group comprises a first identifier to identify the virtual machine and a second identifier to identify the pass-through disk.

18. The processing device of claim 15, wherein when the virtualization software logically attaches the pass-through disk to the virtual machine, the virtualization software is configured to add the disk resource to the temporary resource group and logically attach the storage device to a virtual storage controller on the host machine, wherein the virtual storage controller is owned by the virtual machine.

19. The processing device of claim 15, wherein the instructions further cause the processing device to:
move the disk resource from the temporary resource group to a virtual machine resource group; and
delete the temporary resource group.

20. The processing device of claim 19, wherein the instructions further cause the processing device to:
notify the virtual machine that the pass-through disk is available.

* * * * *